United States Patent
Thompson et al.

(10) Patent No.: US 11,588,424 B2
(45) Date of Patent: Feb. 21, 2023

(54) METHOD OF CONTROLLING A BRUSHLESS PERMANENT MAGNET MOTOR

(71) Applicant: Dyson Technology Limited, Wiltshire (GB)

(72) Inventors: Jack Michael Thompson, Swindon (GB); Samuel Wesley Hinchliffe, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 200 days.

(21) Appl. No.: 17/260,867

(22) PCT Filed: May 17, 2019

(86) PCT No.: PCT/GB2019/051375
§ 371 (c)(1),
(2) Date: Jan. 15, 2021

(87) PCT Pub. No.: WO2020/016548
PCT Pub. Date: Jan. 23, 2020

(65) Prior Publication Data
US 2021/0265926 A1    Aug. 26, 2021

(30) Foreign Application Priority Data
Jul. 17, 2018   (GB) .................................... 1811687.1

(51) Int. Cl.
*H02P 5/00*   (2016.01)
*H02P 6/15*   (2016.01)
(52) U.S. Cl.
CPC .................................. *H02P 6/157* (2016.02)

(58) Field of Classification Search
CPC .... H02P 6/157; H02P 1/42; H02P 1/46; H02P 25/03; H02P 25/04; H02P 1/04; H02P 6/15
See application file for complete search history.

(56) References Cited

U.S. PATENT DOCUMENTS

| 4,546,293 A | 10/1985 | Peterson et al. |
| 4,549,122 A | 10/1985 | Berkopec et al. |

(Continued)

FOREIGN PATENT DOCUMENTS

| GB | 2479626 A | 10/2011 |
| GB | 2516757 A | 2/2015 |

(Continued)

OTHER PUBLICATIONS

International Search Report and Written Opinion dated Jul. 3, 2019, directed to International Application No. PCT/GB2019/051375; 12 pages.

(Continued)

*Primary Examiner* — Muhammad S Islam
(74) *Attorney, Agent, or Firm* — Faegr Drinker Biddle & Reath LLP (57) ABSTRACT

A method of controlling a brushless permanent magnet motor includes measuring a mains power supply voltage of the motor. The method includes determining whether the mains power supply voltage lies within a first range representative of a first country's mains power supply or a second range representative of a second country's mains power supply. The method includes advancing commutation of a winding of the motor relative to a zero-crossing of back EMF in the winding where the mains power supply voltage lies within the first range, and retarding commutation of the (Continued)

winding relative to a zero-crossing of back EMF in the winding where the mains power supply voltage lies within the second range.

6 Claims, 6 Drawing Sheets

(56) References Cited

U.S. PATENT DOCUMENTS

| | | | |
|---|---|---|---|
| 4,949,021 A | 8/1990 | Rozman et al. | |
| 5,029,263 A | 7/1991 | Rozman | |
| 5,168,202 A | 12/1992 | Bradshaw et al. | |
| 5,448,141 A | 9/1995 | Kelley et al. | |
| 5,859,520 A * | 1/1999 | Bourgeois | H02P 6/15 318/727 |
| 6,147,465 A | 11/2000 | Hollenbeck | |
| 6,194,852 B1 | 2/2001 | Lovatt et al. | |
| 7,002,311 B2 | 2/2006 | Strike et al. | |
| 7,821,217 B2 | 10/2010 | Abolhassani et al. | |
| 7,884,580 B2 | 2/2011 | Lee | |
| 8,159,164 B2 | 4/2012 | Horng et al. | |
| 8,686,674 B2 | 4/2014 | Bi et al. | |
| 9,490,731 B2 | 11/2016 | Gohara et al. | |
| 9,602,031 B2 | 3/2017 | Lipp et al. | |
| 9,603,430 B2 | 3/2017 | Seo | |
| 9,973,119 B2 | 5/2018 | Leman et al. | |
| 10,439,523 B2 | 10/2019 | Hinze et al. | |
| 2003/0231875 A1 * | 12/2003 | Masino | H02P 6/30 388/800 |
| 2014/0368141 A1 | 12/2014 | Zheng et al. | |
| 2014/0368144 A1 | 12/2014 | Celik | |
| 2016/0079882 A1 | 3/2016 | Enomoto | |
| 2018/0159456 A1 | 6/2018 | Kato | |

FOREIGN PATENT DOCUMENTS

| | | |
|---|---|---|
| JP | S60-148505 A | 8/1985 |
| JP | H9-238479 A | 9/1997 |
| JP | H9-294389 A | 11/1997 |
| JP | 2011-229388 A | 11/2011 |
| JP | 2015-002674 A | 1/2015 |
| KR | 1998-0006382 U | 4/1998 |
| WO | 2011/128686 A2 | 10/2011 |
| WO | 2013/132247 A1 | 9/2013 |

OTHER PUBLICATIONS

Search Report dated Dec. 14, 2018, directed to GB Application No. 1811687.1; 1 page.

Office Action received for Japanese Patent Application No. 2021-501291, dated Feb. 15, 2022, 6 pages (3 pages of English Translation and 3 pages of Original Document).

* cited by examiner

| Control Signals | | | Power Switches | | | | Inverter Condition |
| --- | --- | --- | --- | --- | --- | --- | --- |
| DIR1 | DIR2 | FW# | Q1 | Q2 | Q3 | Q4 | |
| 0 | 0 | X | 0 | 0 | 0 | 0 | Off |
| 1 | 0 | 1 | 1 | 0 | 0 | 1 | Excite Left-to-Right |
| 0 | 1 | 1 | 0 | 1 | 1 | 0 | Excite Right-to-Left |
| 1 | 0 | 0 | 0 | 0 | 0 | 1 | Freewheel Left-to-Right |
| 0 | 1 | 0 | 0 | 0 | 1 | 0 | Freewheel Right-to-Left |
| 1 | 1 | X | - | - | - | - | Illegal |

METHOD OF CONTROLLING A BRUSHLESS PERMANENT MAGNET MOTOR

REFERENCE TO RELATED APPLICATIONS

This application is a national phase application under 35 USC 371 of International Application No. PCT/GB2019/051375, filed May 17, 2019, which claims the priority of United Kingdom Application No. 1811687.1, filed Jul. 17, 2018, the entire contents of each of which is incorporated herein by reference.

FIELD OF THE DISCLOSURE

The present invention relates to a method of controlling a brushless permanent magnet motor.

BACKGROUND OF THE DISCLOSURE

Different countries have different mains power supply voltages, for example with the UK having a mains power supply voltage of 230V and the USA having a mains power supply voltage of 120V. It may be difficult to provide a brushless permanent magnet motor which is capable of operating in different countries in light of the different mains power supply voltages.

SUMMARY OF THE DISCLOSURE

According to the present invention there is provided a method of controlling a brushless permanent magnet motor, the method comprising measuring a mains power supply voltage of the motor; determining whether the mains power supply voltage lies within a first range representative of a first country's mains power supply or a second range representative of a second country's mains power supply; advancing commutation of a winding of the motor relative to a zero-crossing of back EMF in the winding where the mains power supply voltage lies within the first range; and retarding commutation of the winding relative to a zero-crossing of back EMF in the winding where the mains power supply voltage lies within the second range.

The method according to the present invention may be beneficial principally as the method comprises determining whether the mains supply voltage lies within a first range representative of a first country's mains power supply or a second range representative of a second country's mains power supply; advancing commutation of a winding of the motor relative to a zero-crossing of back EMF in the winding where the mains power supply voltage lies within the first range; and retarding commutation of the winding relative to a zero-crossing of back EMF in the winding where the mains power supply voltage lies within the second range.

In particular, where the mains power supply voltage is relatively low, for example in the first range, the level of phase current being driven into the winding may rise at a slow rate, and it may be difficult to ensure that sufficient phase current is driven into the winding over an electrical half-cycle to achieve the necessary torque to produce the desired output power. At high rotational speeds, for example speeds in excess of 60 krpm, the back EMF induced in the winding may be relatively high, which may also impact on the ability to drive sufficient phase current into the winding to achieve a desired output power.

Advancing commutation of the winding relative to a zero-crossing of back EMF in the winding may enable more phase current to be driven into the winding over the course of an electrical half-cycle, thus allowing the motor to operate at a desired output power. Furthermore, for a permanent magnet motor the torque-to-current ratio is at a maximum when the waveform of the phase current matches that of the back EMF. By advancing commutation of the winding relative to a zero-crossing of back EMF in the winding, the waveform of the phase current driven into the winding may be controlled to more closely follow the waveform of the back EMF induced in the winding.

Where the mains power supply voltage is relatively high, for example in the second range, the level of phase current being driven into the winding may rise at a higher rate compared to the rate provided by a lower mains power supply voltage. The inventors of the present application have found that as the level of phase current induced in the winding increases at a faster rate for a higher mains power supply voltage compared with the rate provided by a lower mains power supply voltage, a sufficient level of current may be driven into the winding in an electrical half-cycle to achieve a desired output power even where commutation of the winding is retarded relative to a zero-crossing of the back EMF in the winding.

If commutation of the winding relative to a zero-crossing of the back EMF in the winding were to be advanced at a relatively high voltage, the waveform of the phase current would not closely follow the waveform of the back EMF induced in the winding, and the phase current may quickly lead the back EMF, thus resulting in less efficient motor performance. By retarding commutation of the winding where the mains power supply voltage is relatively high, and the level of phase current driven into the winding rises at a rate large enough to generate required power demand, the phase current driven into the winding may be more closely aligned with the back EMF induced in the winding.

Thus the method according to the present invention may allow for efficient operation of the motor in countries having different mains power supply voltages by advancing or retarding commutation of a winding of the motor relative to a zero-crossing of back EMF in the winding depending upon the level of the mains power supply voltage of the country in which operation of the motor occurs.

The first range may comprise voltages lower than voltages of the second range. The first range may comprise voltages between 85-140V. The second range may comprise voltages between 180-265V. A relevant voltage range may be determined prior to start-up of the motor. For example, a processor may determine the relevant voltage range prior to start-up of the motor. The mains power supply may comprise an AC mains power supply.

The method may comprise a method of controlling a brushless permanent magnet motor in a steady-state. The method may comprise a method of controlling a brushless permanent magnet motor within an operating speed range of 60-120 krpm.

The method may comprise dividing each half of an electrical cycle into at least one energisation period and at least one de-energisation period. The winding may be excited during the at least one energisation period. For example, current may be driven into the phase winding during the at least one energisation period. Current may be allowed to leave the phase winding during the de-energisation period. For example, the phase winding may be freewheeled during the de-energisation period and/or an inverter of the motor may be switched off during the de-energisation period. The de-energisation period may comprise a freewheel period. A de-energisation period may occur post- or pre- an energisation period.

Where the mains power supply voltage lies within the second range, the energisation period may comprise a single energisation period, the de-energisation period may comprise a single de-energisation period, and the de-energisation period may occur after the energisation period. This may be beneficial as where the mains power supply voltage lies within the second range, commutation of the winding is retarded relative to a zero-crossing of back EMF in the winding, and the level of phase current in the winding increases at a relatively quick rate. Thus the phase current initially trails the back EMF induced in the winding, before rising relatively quickly during the energisation period and decreasing during the de-energisation period. By using only a single energisation period and a single de-energisation period, switching losses may be reduced compared to, for example, a method comprising multiple energisation and de-energisation periods each electrical half-cycle.

It has been found that an electrical half-cycle comprising a single energisation period and a single de-energisation period, where the mains power supply voltage lies within the second range, may provide a phase current which more closely follows the back EMF than, for example, an electrical half-cycle which comprises multiple energisation and/or de-energisation periods, and hence which may provide more efficient operation.

Nevertheless, it is also envisaged that where the mains power supply voltage lies within the second range, an electrical half-cycle may be divided into a first energisation period, a first de-energisation period, a second energisation period, and a second de-energisation period, the first de-energisation period may occur between the first and second energisation periods, and the second de-energisation period may occur after the second energisation period. The first de-energisation period may thereby check the rise of phase current within the winding, such that the phase current more closely follows the back EMF induced in the winding.

Where the mains power supply voltage lies within the first range, an electrical half-cycle may be divided into a first energisation period, a first de-energisation period, a second energisation period, and a second de-energisation period, the first de-energisation period may occur between the first and second energisation periods, and the second de-energisation period may occur after the second energisation period. The level of phase current in the winding increases at a relatively slow rate where the mains power supply voltage lies within the first range. Nevertheless, as commutation of the winding is advanced relative to a zero-crossing of back EMF in the winding where the mains power supply voltage lies within the first range, the phase current may quickly lead the back EMF induced in the winding. The first de-energisation period may check the rise of phase current within the winding, such that the phase current more closely follows the back EMF induced in the winding, thereby resulting in more efficient operating of the motor.

Measuring a mains power supply voltage of the motor may comprise indirectly measuring a mains power supply voltage of the motor, for example by measuring a DC link voltage of the motor, and using the measured DC link voltage of the motor to determine the mains power supply voltage of the motor. Measuring a mains power supply voltage may comprise directly measuring a mains power supply voltage of the motor.

According to a further aspect of the present invention there is provided a data carrier comprising machine readable instructions for the operation of one or more processors of a controller of a brushless permanent magnet motor to measure a mains power supply voltage of the motor; determine whether the mains power supply voltage lies within a first range representative of a first country's mains power supply or a second range representative of a second country's mains power supply; advance commutation of a winding of the motor relative to a zero-crossing of back EMF in the winding where the mains power supply voltage lies within the first range; and retard commutation of the winding relative to a zero-crossing of back EMF in the winding where the mains power supply voltage lies within the second range.

According to a further aspect of the present invention there is provided a brushless permanent magnet motor comprising a winding and a controller configured to measure a mains power supply voltage of the motor; determine whether the mains power supply voltage lies within a first range representative of a first country's mains power supply or a second range representative of a second country's mains power supply; advance commutation of the winding relative to a zero-crossing of back EMF in the winding where the mains power supply voltage lies within the first range; and retard commutation of the winding relative to a zero-crossing of back EMF in the winding where the mains power supply voltage lies within the second range.

Preferential features of aspects of the present invention may be equally applicable to other aspects of the present invention, where appropriate.

BRIEF DESCRIPTION OF THE FIGURES

In order to better understand the present invention, and to show more clearly how the invention may be put into effect, the invention will now be described, by way of example, with reference to the following drawings.

DETAILED DESCRIPTION OF THE DISCLOSURE

Figure 1:
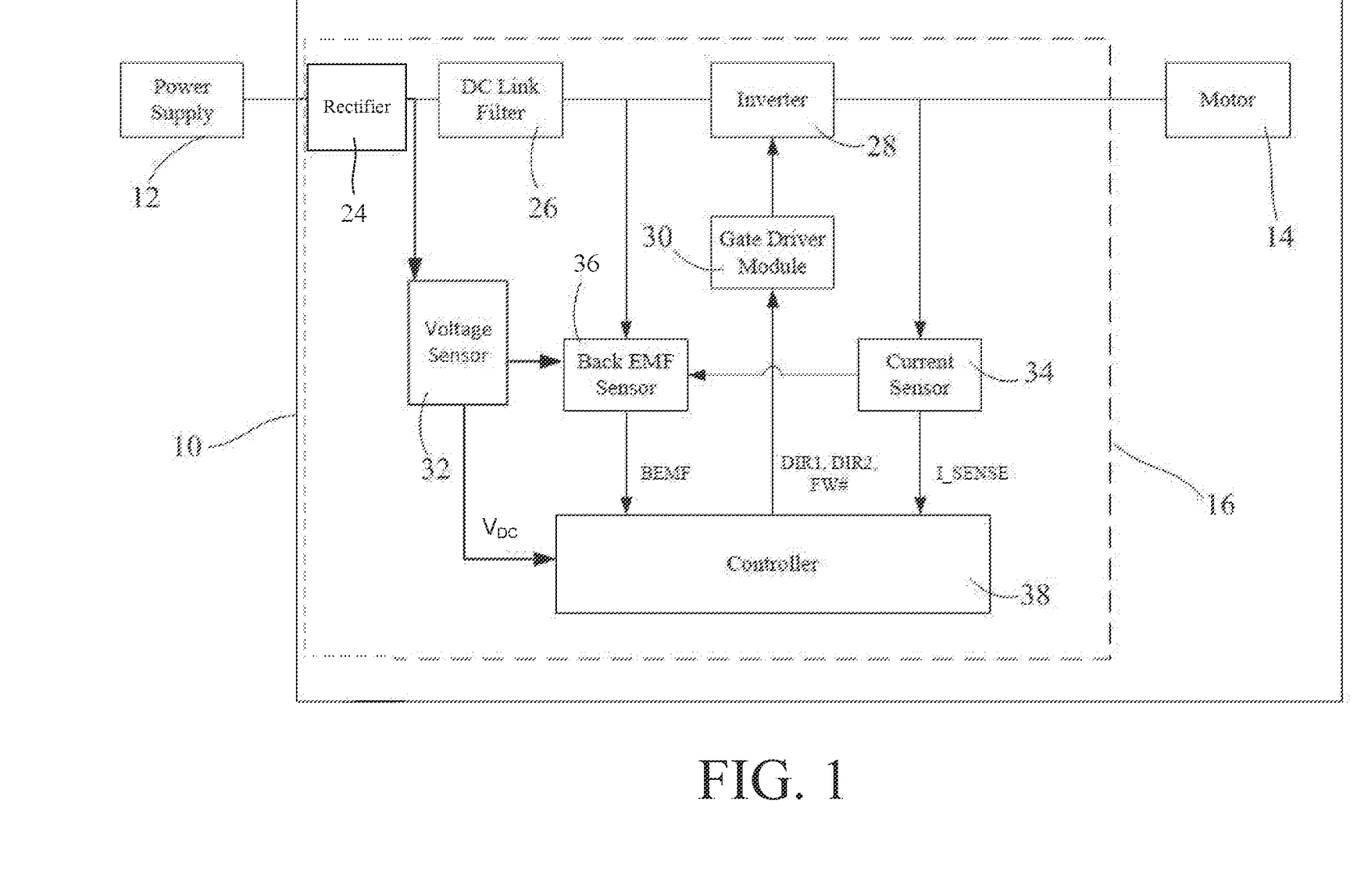
FIG. 1 is a block diagram of a motor system in accordance with the present invention.
Figure 2:
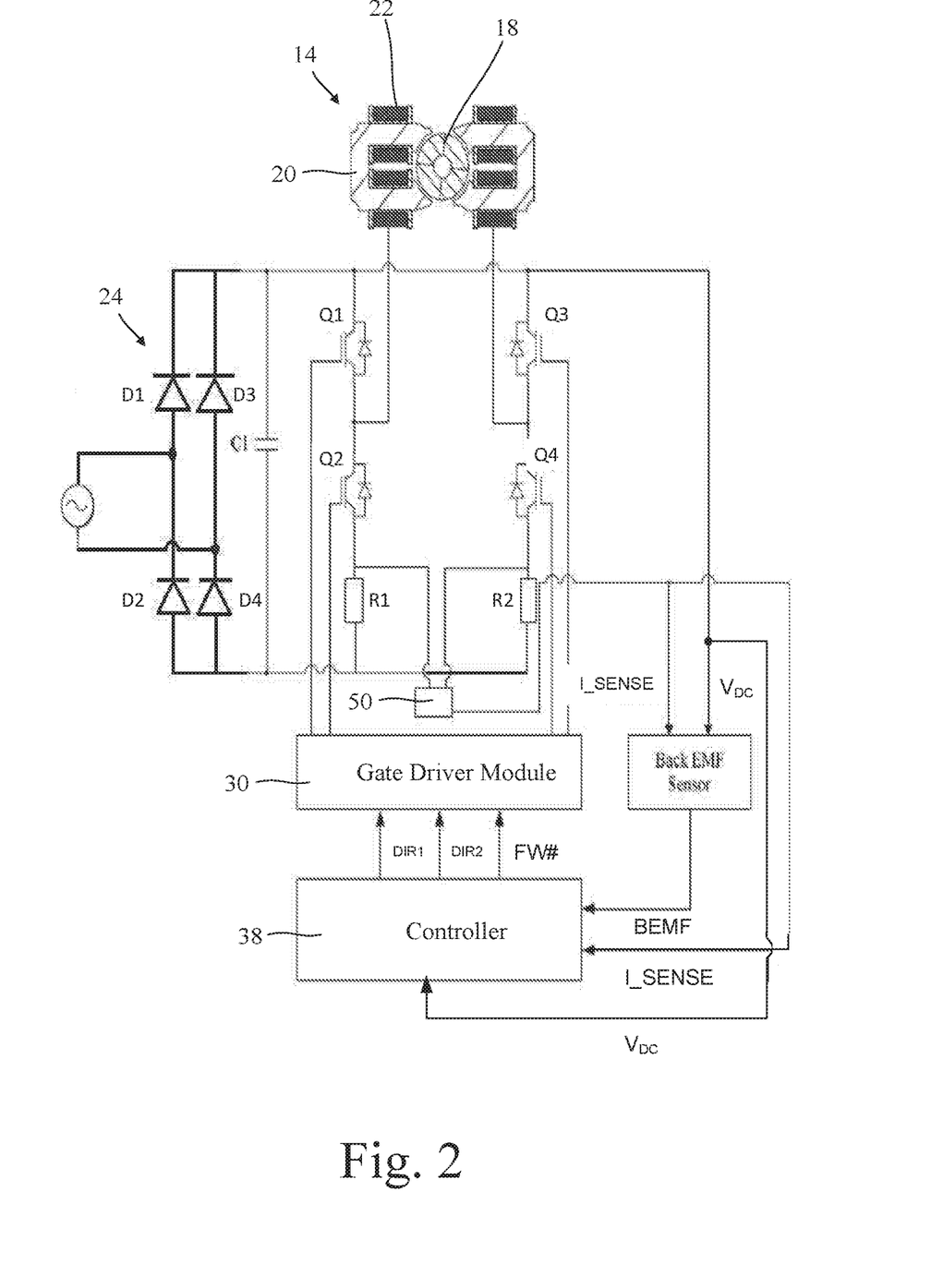
FIG. 2 is a schematic diagram of the motor system of FIG. 1.

The motor system 10 of FIGS. 1 and 2 is powered by an AC mains power supply 12 and comprises a brushless motor 14 and a control system 16.

The motor 14 comprises a four-pole permanent-magnet rotor 18 that rotates relative to a four-pole stator 20. Conductive wires are wound about the stator 20 and are coupled together (e.g. in series or parallel) to form a single phase winding 22.

The control system 16 comprises a rectifier 24, a DC link filter 26, an inverter 28, a gate driver module 30, a mains power supply voltage sensor 32, a current sensor 34, a back EMF sensor 36, and a controller 38.

The rectifier 24 is a full-wave bridge D1-D4 that rectifies the output of the AC mains power supply 12 to provide a DC link voltage.

The DC link filter 26 comprises a capacitor C1 that smoothes the relatively high-frequency ripple that arises from switching of the inverter 28.

The inverter 28 comprises a full bridge of four power switches Q1-Q4 that couple the DC link voltage to the phase winding 22. Each of the switches Q1-Q4 includes a freewheel diode.

The gate driver module 30 drives the opening and closing of the switches Q1-Q4 in response to control signals received from the controller 38.

The mains power supply voltage sensor 32 outputs a signal VDC to the controller 38, which determines an operating condition of the motor system 10 in steady-state mode, as will be discussed in more detail below.

The current sensor 34 comprises a pair of sense resistors R1 and R2, and a multiplexer 50. Each resistor R1,R2 is located on a lower leg of the inverter 28, with one of the resistors R2 providing a measure of the phase current when excited from left to right, and the other resistor R1 providing a measure of the phase current when excited from right to left. The multiplexer 50 selects one of the two signals output by the sense resistors R1,R2. The voltage across the current sensor 34 is output to the back EMF sensor 36 and the controller 38 as a current sense signal, I_SENSE.

The back EMF sensor 36 generates a digital signal, BEMF, which is output to the controller 38. A more detailed description of the back EMF sensor 36 is provided below.

The controller 38 comprises a microcontroller having a processor, a memory device, and a plurality of peripherals (e.g. ADC, comparators, timers etc.). The memory device stores instructions for execution by the processor, as well as control parameters (e.g. current limit, rise-time threshold, speed threshold, freewheel period, advance period, retard period, energisation period, etc.) for use by the processor. The controller 38 is responsible for controlling the operation of the motor system 10 and generates three control signals: DIR1, DIR2, and FW#. The control signals are output to the gate driver module 30, which in response drives the opening and closing of the switches Q1-Q4 of the inverter 28.

DIR1 and DIR2 control the direction of current through the inverter 28 and thus through the phase winding 22. When DIR1 is pulled logically high and DIR2 is pulled logically low, the gate driver module 30 closes switches Q1 and Q4, and opens switches Q2 and Q3, thus causing current to be driven through the phase winding 22 from left to right. Conversely, when DIR2 is pulled logically high and DIR1 is pulled logically low, the gate driver module 30 closes switches Q2 and Q3, and opens switches Q1 and Q4, thus causing current to be driven through the phase winding 22 from right to left. Current in the phase winding 22 is therefore commutated by reversing DIR1 and DIR2. If both DIR1 and DIR2 are pulled logically low, the gate drive module 30 opens all switches Q1-Q4.

FW# is used to disconnect the phase winding 22 from the DC link voltage and allow current in the phase winding 22 to freewheel around the low-side loop of the inverter 28. Accordingly, in response to a FW# signal that is pulled logically low, the gate driver module 30 causes both high-side switches Q1,Q3 to open. It will, however, be recognised that freewheeling may be achieved by using various switch combinations, for example by opening one or more switches. Alternatively, it will be recognised that de-energisation of the phase winding 22 may be achieved by turning off the inverter 28 altogether.

Each power switch Q1-Q4 conducts in a single direction only. Consequently, current freewheels through one of the low-side switches Q2,Q4 and through a freewheel diode of the other low-side switch Q2,Q4. Certain types of power switch (e.g. MOSFETs) are capable of conducting in both directions. Accordingly, rather than freewheeling through a freewheel diode, both low-side switches Q2,Q4 may be closed such that current freewheels through both low-side switches Q2,Q4, i.e. in addition to opening both high-side switches Q1,Q3, both low-side switches Q2,Q4 are closed in response to a logically low FW# signal.

Figure 3:
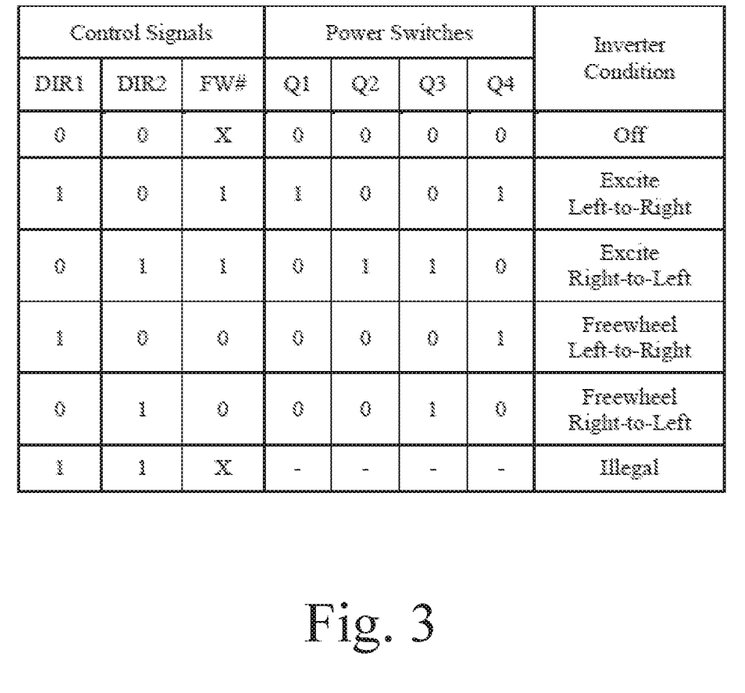
FIG. 3 details allowed states of an inverter of the motor system of FIG. 1 in response to control signals issued by a controller of the motor system.

FIG. 3 summarises the allowed states of the switches Q1-Q4 in response to the control signals of the controller 38. Hereafter, the terms 'set' and 'clear' will be used to indicate that a signal has been pulled logically high and low respectively.

The controller 38 operates in one of three modes depending on the speed of the rotor 18. When the rotor 18 is stationary, the controller 38 operates in start-up mode, which is employed merely to start the rotor 18 moving in a forward direction. Once the rotor 18 is moving forwards, the controller 38 switches to acceleration mode. The controller 38 operates in acceleration mode until the speed of the rotor 18 exceeds a speed threshold, after which the controller 38 switches to steady-state mode. Within each mode of operation, the controller 38 employs a different scheme to control the motor 14 without the need for a dedicated rotor sensor.

The details of the start-up mode and acceleration mode of the controller 38 are not pertinent to the present invention, and hence are not included here for the sake of brevity. Details of an appropriate start-up mode and acceleration mode of the controller 38 can be found in the applicant's prior published PCT patent application WO2013/132247.

When operating in steady-state mode, the controller 38 utilises the back EMF sensor 36 for determining the position of the rotor 18. As will now be explained, the back EMF sensor 36 outputs a digital signal for which certain edges correspond to aligned positions of the rotor 18.

In the absence of any significant saturation or saliency, the voltage equation for the phase winding 22 may be expressed as:

$$V_{ph}=i_{ph}R_{ph}+L_{ph}\cdot di_{ph}/dt+E_{ph}$$

where $V_{ph}$ is the voltage across the phase winding 22, $i_{ph}$ is the current in the phase winding 22, $R_{ph}$ is the resistance of the phase winding 22, $L_{ph}$ is the inductance of the phase winding 22, and $E_{ph}$ is the back EMF induced in the phase winding 22 by the rotor 18.

When the rotor 18 is at an aligned position, the back EMF induced in the phase winding 22 is zero. At each zero-crossing in the back EMF, the voltage equation becomes:

$$V_{ph}=i_{ph}R_{ph}+L_{ph}\cdot di_{ph}/dt$$

The $i_{ph}R_{ph}$ term is negligible around zero-crossings in the back EMF. Consequently, for each aligned position of the rotor 18, the voltage equation reduces to:

$$V_{ph}=L_{ph}\cdot di_{ph}/dt$$

The back EMF sensor 36 makes use of this equation to generate an output signal having edges that correspond to aligned positions of the rotor 18.

Figure 4:
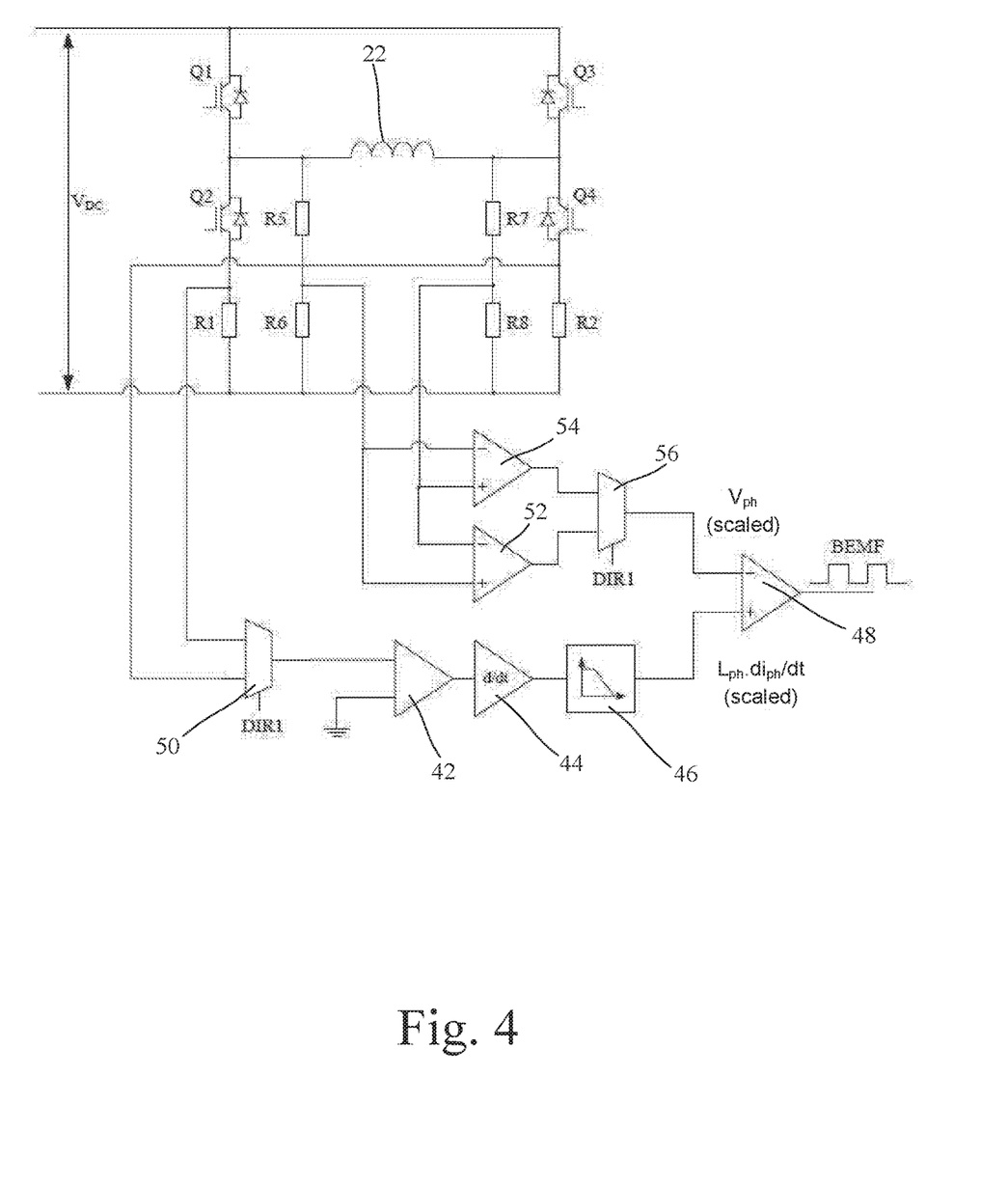
FIG. 4 is a schematic view of a back EMF sensor for use in the motor system of FIG. 1.

As illustrated in FIG. 4, the back EMF sensor 36 comprises a voltage sensor 40, an amplifier 42, a differentiator 44, a low-pass filter 46, and a comparator 48. The back EMF sensor 36 receives a current sense signal, I_SENSE, from the current sensor 34.

The current sensor 34 comprises a pair of sense resistors R1 and R2, and a multiplexer 50. Each resistor R1,R2 is located on a lower leg of the inverter 28, with one of the resistors R2 providing a measure of the phase current when excited from left to right, and the other resistor R1 providing a measure of the phase current when excited from right to left. The multiplexer 50 selects one of the two signals output by the sense resistors R1,R2.

The voltage sensor 40 comprises a pair of potential dividers R5,R6 and R7,R8, a pair of differential amplifiers 52,54 and a multiplexer 56. The potential dividers R5,R6 and R7,R8 are located on opposite sides of the phase winding 22, and the outputs of the dividers R5,R6,R7,R8 are fed to both differential amplifiers 52,54. The signal output by one of the amplifiers 52 provides a measure of the phase voltage when excited from left to right, and the signal output by the other amplifier 54 provides a measure of the phase voltage when excited from right to left. The multiplexer 56 selects one of the two signals output by the amplifiers 52,54. The voltage sensor 40 outputs a first signal having a voltage that is proportional to the DC link voltage, VDC. When the phase winding 22 is excited, the voltage across the phase winding, Vph, corresponds to the DC link voltage, VDC, minus the voltage drop across the power switches Q1-Q4. Consequently, the first signal output by the voltage sensor 40 has a voltage that is proportional to that across the phase winding, Vph, during energisation.

The DIR1 signal output by the controller 38 is used as the selector input for both multiplexers 50,56. Accordingly, the multiplexers 50,56 select one of the amplifiers 52,54 and one of the sense resistors R1,R2 according to the direction of current through the phase winding 22. By locating the potential dividers R5,R6,R7,R8 on opposite sides of the phase winding 22, and by locating the sense resistors R1,R2 on opposite legs of the inverter 28, the phase current may be sensed during freewheeling as well as energisation.

The amplifier 42 operates on the I_SENSE signal output by the current sensor 34. The differentiator 44 then operates on the signal output of the amplifier 42, and the low-pass filter 46 operates on the signal output by the differentiator 44. The current sensor 34 may be said to output a second signal having a voltage that is proportional to current in the phase winding 22. The differentiator 44 then differentiates the second signal and generates in response a third signal having a voltage that is proportional to the rate of change of current in the phase winding, diph/dt. The inductance of the phase winding 22 is assumed to be constant (this is valid when the motor 14 has little or no saliency and saturation effects are minimal) and thus the voltage of the third signal is proportional to Lph·diph/dt.

The low-pass filter 46 is employed merely to suppress any noise that may have been introduced into the third signal by the differentiator 44. If noise is not regarded as a problem then the filter 46 may be omitted. In FIG. 4, the low-pass filter 46 and the differentiator 44 are shown as two distinct components. Alternatively, the low-pass filter 46 may be implemented as part of the differentiator 44, thus avoiding the need for an additional operational amplifier.

The amplifier 42 ensures that the voltages of the first signal and the third signal are scaled appropriately such that the voltages of the two signals correspond when the back EMF induced in the phase winding 22 is zero, i.e. the voltages correspond when Vph=Lph·diph/dt.

The comparator 48 compares the voltages of the first and third signals and generates a digital output signal in response to the comparison. The output signal is logically high (or alternatively logically low) when the voltage of the first signal is greater than the voltage of the second signal (i.e. when Vph>Lph·diph/dt), and logically low (or alternatively logically high) when the voltage of the first signal is lower than the voltage of the second signal (i.e. when Vph<Lph·diph/dt). An edge is therefore generated in the output signal whenever the voltages of the two signals correspond, i.e. whenever Vph=Lph·diph/dt. This condition is satisfied when the back EMF induced in the phase winding 22 is zero. Consequently, an edge is generated in the output signal when the rotor 18 is at an aligned position.

In response to a falling edge in the BEMF signal, the controller 38 subtracts a phase period, T_PHASE, from the period of the electrical half-cycle, T_HC, in order to obtain the commutation period, T_COM:

$$T\_COM = T\_HC - T\_PHASE$$

The controller 38 then commutates the phase winding 22 at a time, T_COM, after the falling edge. As a result, the controller 38 commutates the phase winding 22 relative to the next rotor aligned position by the phase period, T_PHASE. If the phase period is positive, commutation occurs before the rotor aligned position (advanced commutation). If the phase period is zero, commutation occurs at the rotor aligned position (synchronous commutation). And if the phase period is negative, commutation occurs after the rotor aligned position (retarded commutation).

In steady-state mode, commutation of the phase winding 22 occurs before the rotor aligned position (advanced commutation), or commutation occurs after the rotor aligned position (retarded commutation), depending on the voltage of the AC mains power supply 12 with which the motor 14 is being used.

As mentioned above, the mains power supply voltage sensor 32 outputs a signal VDC to the controller 38. Prior to start-up the controller 38 utilises the signal VDC to determine the AC mains supply voltage that the motor is being supplied with, and compares the determined AC mains supply voltage to stored predetermined voltage ranges which correspond to voltage ranges that encompass the voltages of AC mains power supplies of different countries. For example, the controller 38 may compare the determined AC mains supply voltage to a first predetermined voltage range of 85V-140V and to a second predetermined voltage range of 180-265V. Where the determined AC mains supply voltage (based on VDC) lies within the first predetermined voltage range the controller 38 acts to implement advanced commutation during steady state operation, and where the determined AC mains supply voltage (based on VDC) lies within the second predetermined voltage range, the controller 38 acts to implement retarded commutation during steady state operation, for the reasons discussed below. Thus the controller 38 can act to achieve effective operation of the motor 14 irrespective of the AC mains voltage supply with which the motor 14 is to be used, and the country in which the motor 14 is to be used.

In the event that the AC mains voltage supply is not within either of the allowable voltage ranges for advanced commutation or retarded commutation, the motor will not start and the system will enter its designated standby mode.

Advanced commutation is implemented in steady-state mode where a relatively low AC mains voltage is provided by the AC mains power supply 12. In particular, where the mains power supply voltage is relatively low, the level of phase current being driven into the phase winding 22 may rise at a slow rate, and it may be difficult to ensure that sufficient phase current is driven into the winding 22 over an electrical half-cycle to achieve a desired output power. At high rotational speeds, for example speeds in excess of 60 krpm, the back EMF induced in the winding may be relatively high, which may also impact on the ability to drive sufficient phase current into the phase winding 22 to achieve a desired output power.

Advancing commutation of the phase winding 22 relative to a zero-crossing of back EMF in the winding 22 may enable more phase current to be driven into the winding 22 over the course of an electrical half-cycle, thus allowing the motor to operate at a desired output power. Furthermore, for a permanent magnet motor, the torque-to-current ratio is at a maximum when the waveform of the phase current matches that of the back EMF. By advancing commutation of the winding 22 relative to a zero-crossing of back EMF in the winding 22, the waveform of the phase current driven into the winding may be controlled to more closely follow the waveform of the back EMF induced in the winding.

Figure 5:
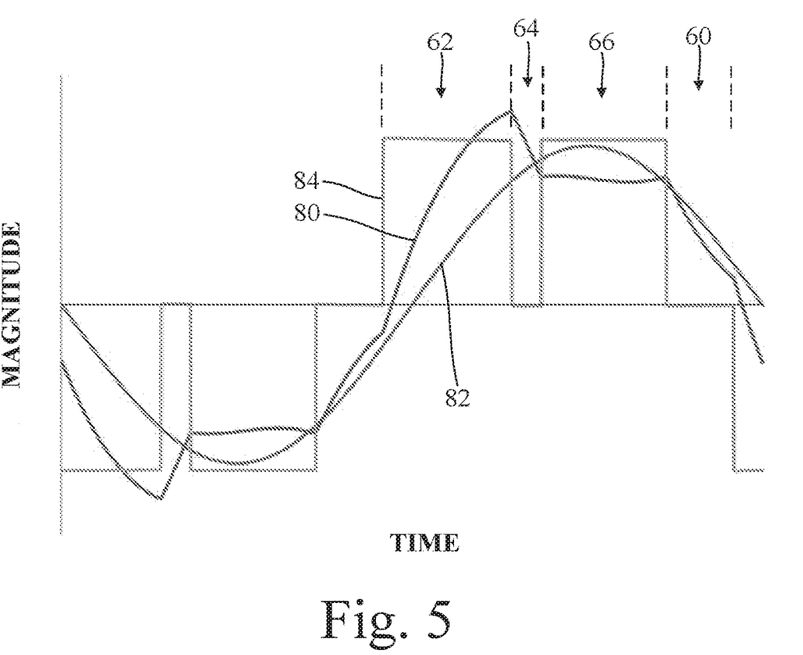
FIG. 5 illustrates various waveforms of the motor system of FIG. 1 when operating using a relatively low mains voltage within steady-state mode.

Example waveforms of the phase current 80, back EMF 82, and applied voltage 84 during advanced commutation at relatively low mains supply voltages can be seen in FIG. 5.

Retarded commutation is implemented in steady-state mode where a relatively high AC mains voltage is provided by the AC mains power supply 12. In particular, where the mains power supply voltage is relatively high, the level of phase current being driven into the winding may rise at a higher rate compared to the rate provided by a lower mains power supply voltage. If commutation of the phase winding 22 relative to a zero-crossing of the back EMF in the winding 22 is advanced at such a higher voltage, the waveform of the phase current would not closely follow the waveform of the back EMF induced in the winding 22, and the phase current may quickly lead the back EMF, thus resulting in less efficient motor performance.

The inventors of the present application have found that as the level of phase current induced in the phase winding 22 increases at a faster rate for a higher mains power supply voltage compared with the rate provided by a lower mains power supply voltage, a sufficient level of current may be driven into the winding 22 in an electrical half-cycle to achieve a desired output power even where commutation of the winding 22 is retarded relative to a zero-crossing of the back EMF in the winding 22. Furthermore, by retarding commutation of the winding 22 where the mains power supply voltage is relatively high, and the level of phase current driven into the winding 22 rises at a quicker rate, the phase current driven into the winding may be controlled to more closely follow the back EMF induced in the winding 22.

Figure 6:
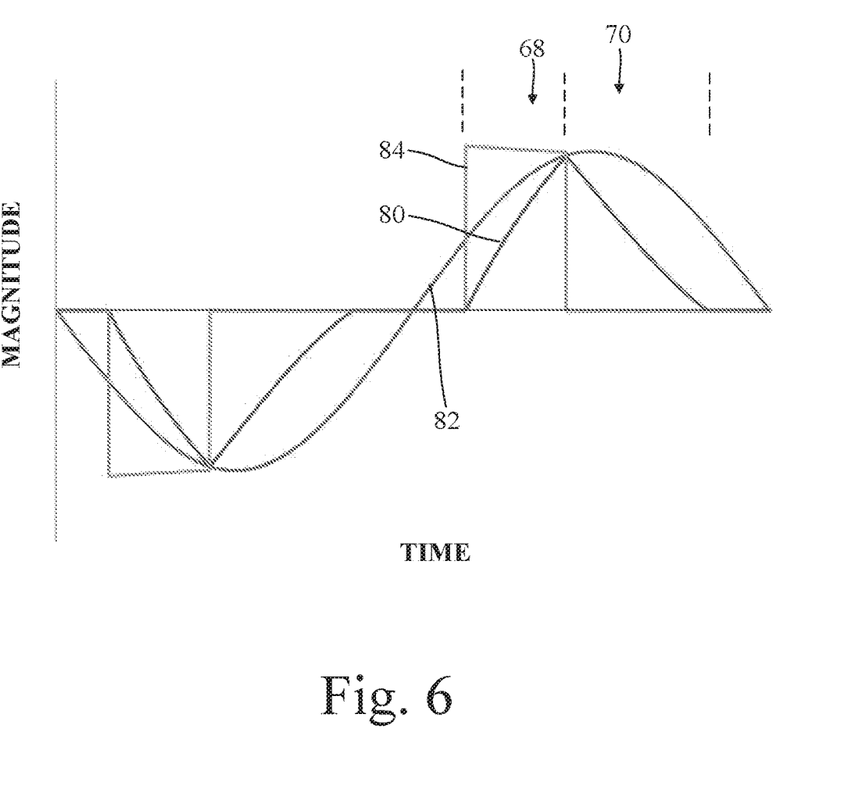
FIG. 6 illustrates various waveforms of the motor system of FIG. 1 when operating using a relatively high mains voltage within steady-state mode.

Example waveforms of the phase current 80, back EMF 82, and applied voltage 84 during retarded commutation at relatively high mains voltages can be seen in FIG. 6.

Thus the controller 38 may allow for efficient operation of the motor 14 in countries having different mains power supply voltages by advancing or retarding commutation of the phase winding 22 of the motor relative to a zero-crossing of back EMF in the winding 22 depending upon the level of the mains power supply voltage of the country in which operation of the motor 14 occurs.

Figure 7:
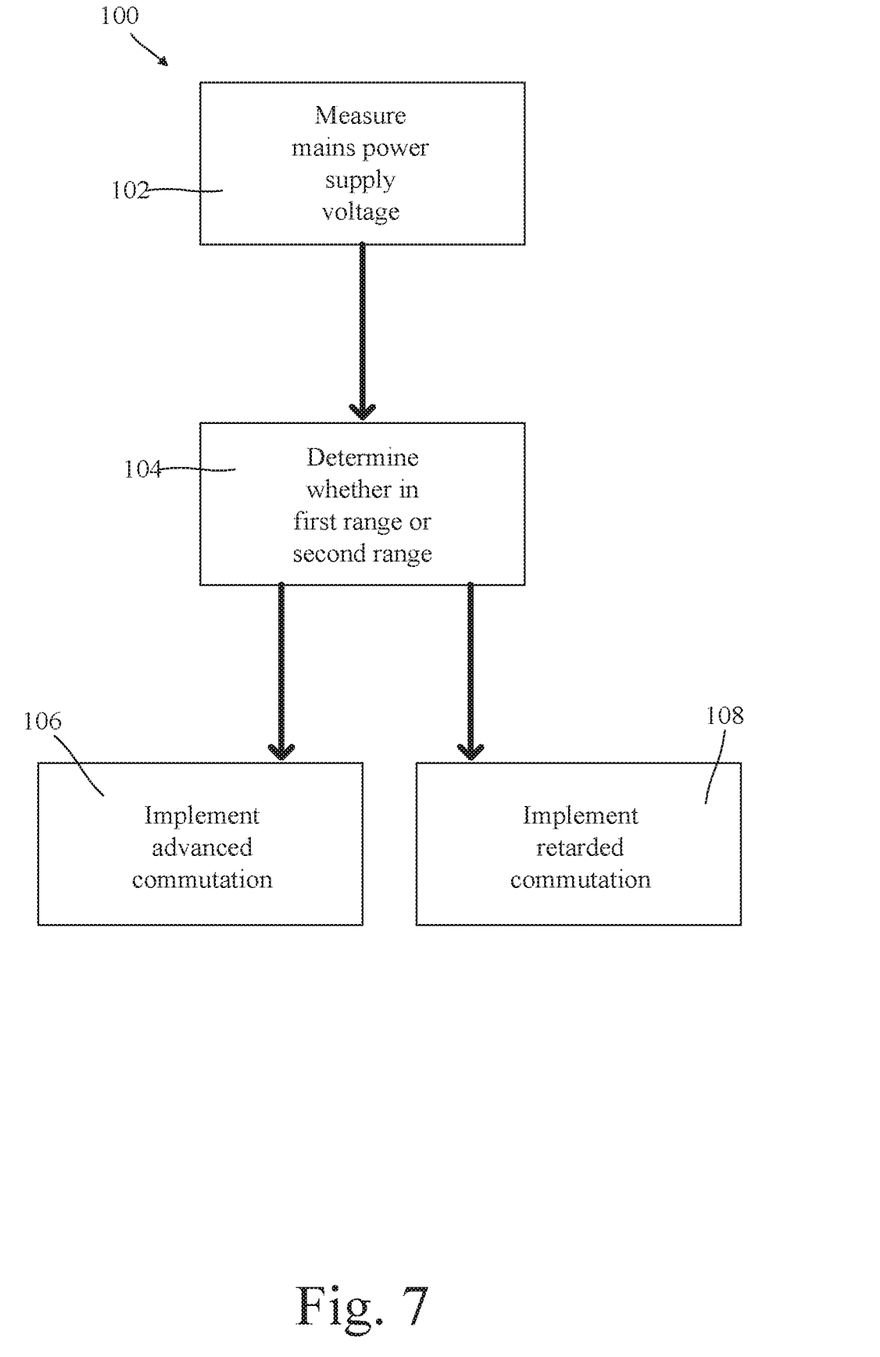
FIG. 7 is a flow diagram illustrating a method according to the present invention.

The method 100 of controlling the motor 14 is shown schematically in FIG. 7, and includes measuring 102 a mains power supply voltage of the motor 14, determining 104 whether the mains power supply voltage lies within a first range representative of a first country's mains power supply or a second range representative of a second country's mains power supply, advancing 106 commutation of a winding of the motor relative to a zero-crossing of back EMF in the winding where the mains power supply voltage lies within the first range, and retarding 108 commutation of the winding relative to a zero-crossing of back EMF in the winding where the mains power supply voltage lies within the second range.

As mentioned above, for a permanent magnet motor, the torque-to-current ratio is at a maximum when the waveform of the phase current matches that of the back EMF. The controller 38 can also control the duration and form of the energisation period, ie the period during which phase current is driven into the phase winding 22, and the de-energisation period, ie the period in which current is allowed to leave the phase winding 22, to attempt to best match the waveform of the phase current in the winding 22 to that of the back EMF for improved efficiency.

As can be seen from FIG. 5, where the controller 38 operates using advanced commutation relative to a zero-crossing of back EMF, ie where the AC mains supply voltage is relatively low, each half of an electrical cycle is divided into a first energisation period 62, a first de-energisation period 64, a second energisation period 66, and a second de-energisation period 60. Here the de-energisation periods 64,60 are freewheel periods, and may be referred to as such accordingly. The first freewheel period 64 occurs between the first 62 and second 66 energisation periods, and the second freewheel period 60 occurs after the second energisation period 66.

The level of phase current in the phase winding 22 increases at a relatively slow rate where the mains power supply voltage is relatively low. Nevertheless, as commutation of the winding 22 is advanced relative to a zero-crossing of back EMF in the winding 22 where the mains power supply voltage is relatively low, the phase current may quickly lead the back EMF induced in the winding 22. The first freewheel period 64 may check the rise of phase current within the winding 22, such that the phase current more closely follows the back EMF induced in the winding 22, thereby resulting in more efficient operating of the motor. The second freewheel period 60 occurs in the region of falling back EMF, where less torque is achieved for a given level of current. Accordingly, by freewheeling within this region, a more efficient motor may be realised.

As can be seen from FIG. 6, where the controller 38 operates using retarded commutation relative to a zero-crossing of back EMF, ie where the AC mains supply voltage is relatively high, each half of an electrical cycle is divided into a single energisation period 68, followed by a single de-energisation period 70. The single de-energisation period 70 here comprises a single freewheel period, and will hereafter be referred to as such accordingly. The single freewheel period 70 occurs after the single energisation period 68.

At relatively high mains power supply voltages, the level of phase current in the phase winding 22 increases at a relatively quick rate. During retarded commutation at a relatively high voltage, the phase current initially trails the back EMF induced in the winding 22, before rising relatively quickly during the energisation period and decreasing during the de-energisation period. By using only a single energisation period 68 and a single freewheel period 70, switching losses may be reduced compared to, for example, a method comprising multiple energisation and freewheel periods each electrical half-cycle. It has been found that an electrical half-cycle comprising a single energisation period

68 and a single freewheel period 70, where the mains power supply voltage is relatively high, may provide a phase current which more closely follows the back EMF than, for example, an electrical half-cycle which comprises multiple energisation and/or freewheel periods, and hence which may provide more efficient operation.

Nevertheless, it is also envisaged that where the mains power supply voltage is relatively high, the electrical half-cycle may be split into different energisation and de-energisation periods, as described above in relation to operating using advanced commutation at relatively low voltages.

The invention claimed is:

1. A method of controlling a brushless permanent magnet motor, the method comprising measuring a mains power supply voltage of the motor; determining whether the mains power supply voltage lies within a first range representative of a first country's mains power supply or a second range representative of a second country's mains power supply; advancing commutation of a winding of the motor relative to a zero-crossing of back EMF in the winding where the mains power supply voltage lies within the first range; and retarding commutation of the winding relative to a zero-crossing of back EMF in the winding where the mains power supply voltage lies within the second range.

2. The method of claim 1, wherein the first range comprises voltages lower than voltages within the second range.

3. The method of claim 1, wherein the method comprises dividing each half of an electrical cycle into at least one energisation period and at least one de-energisation period, and where the mains power supply voltage lies within the second range, the energisation period comprises a single energisation period, the de-energisation period comprises a single de-energisation period, and the de-energisation period occurs after the energisation period.

4. The method of claim 1, wherein the method comprises dividing each half of an electrical cycle into at least one energisation period and at least one de-energisation period, and where the mains power supply voltage lies within the first range, each half of an electrical cycle is divided into a first energisation period, a first de-energisation period, a second energisation period, and a second de-energisation period, the first de-energisation period occurs between the first and second energisation periods, and the second de-energisation period occurs after the second energisation period.

5. A data carrier comprising machine readable instructions for the operation of one or more processors of a controller of a brushless permanent magnet motor to measure a mains power supply voltage of the motor; determine whether the mains power supply voltage lies within a first range representative of a first country's mains power supply or a second range representative of a second country's mains power supply; advance commutation of a winding of the motor relative to a zero-crossing of back EMF in the winding where the mains power supply voltage lies within the first range; and retard commutation of the winding relative to a zero-crossing of back EMF in the winding where the mains power supply voltage lies within the second range.

6. A brushless permanent magnet motor comprising a winding and a controller configured to measure a mains power supply voltage of the motor; determine whether the mains power supply voltage lies within a first range representative of a first country's mains power supply or a second range representative of a second country's mains power supply; advance commutation of the winding relative to a zero-crossing of back EMF in the winding where the mains power supply voltage lies within the first range; and retard commutation of the winding relative to a zero-crossing of back EMF in the winding where the mains power supply voltage lies within the second range.

* * * * *